March 7, 1967   D. L. WAGNER ET AL   3,307,743
SYSTEM AND METHOD FOR DISPENSING MATERIALS
Filed Jan. 14, 1965   2 Sheets-Sheet 1

INVENTORS
HUGH W. COLLINS
DAVID L. WAGNER
BY
ATTORNEY

March 7, 1967 D. L. WAGNER ETAL 3,307,743
SYSTEM AND METHOD FOR DISPENSING MATERIALS
Filed Jan. 14, 1965 2 Sheets-Sheet 2

INVENTORS
HUGH W. COLLINS
DAVID L. WAGNER
BY
ATTORNEY

United States Patent Office 3,307,743
Patented Mar. 7, 1967

3,307,743
SYSTEM AND METHOD FOR DISPENSING
MATERIALS
David L. Wagner, Findlay, Ohio, and Hugh W. Collins,
Arlington, Ill., assignors to Marathon Oil Company,
Findlay, Ohio, a corporation of Ohio
Filed Jan. 14, 1965, Ser. No. 425,462
5 Claims. (Cl. 222—1)

The present invention relates to systems and devices for the control of dispensing of materials and in particular relates to systems and devices for permitting the dispensing of materials to customers until predetermined monetary or quantitative amounts have been dispensed in a predetermined time interval.

In a variety of distribution stations and particularly in petroleum product bulk stations, it is desirable to minimize and in some cases to eliminate attendants required to control the dispensing of the materials available for sale. Most such installations sell only to a relatively constant group of customers and, in most cases, the amount which the vendor is willing to charge to the customers credit is predetermined by reference to a predetermined list of credit limits. These are usually expressed as the maximum amount of dollars permitted to be outstanding at any given time for the particular customer, or the maximum material which the customer is to be permitted to withdraw during a given interval, most usually one month.

In such petroleum bulk stations, the exact amount of the delivery is typically determined by the amount which the tank truck, tank car, or other container will hold and the delivery is discontinued when the tank is full. This discontinuing of delivery may be accomplished either by manual operation of a shutoff valve or by relatively automatic fill valve which will shut off when a predetermined liquid level or ullage is reached. The vendor usually does not need to control the individual amounts which a customer withdraws of each of the various commodities which he has for sale. Instead, the vendor wishes to control the total monetary amount which the customer withdraws.

The present system, by maintaining a balance of allowable credit on each individual customer and by permitting withdrawals by the customer or his agent only when a balance of allowable credit remains, permits virtually automatic operation of a bulk station. Withdrawals may be made either by the customer or by his agent as, for example, by a common carrier empowered by the customer to pick up materials for his account.

Figure 1:
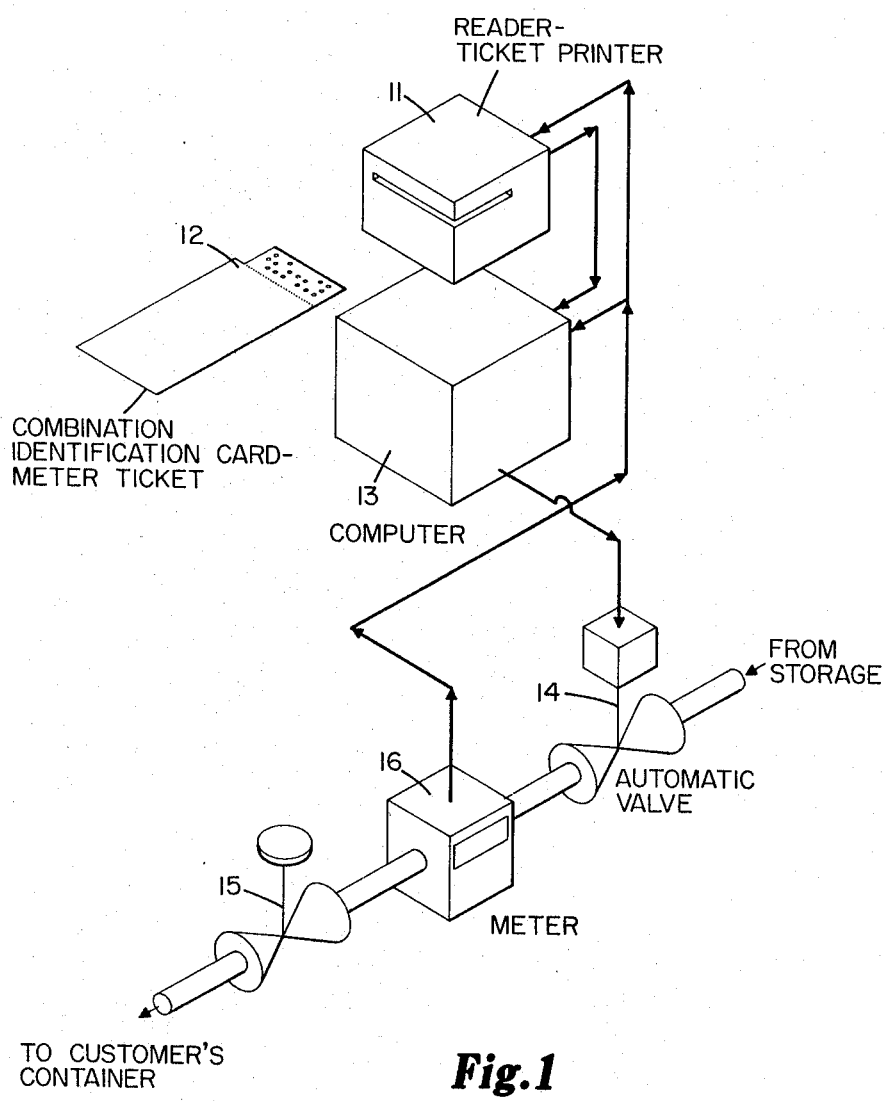
FIGURE 1 is a schematic drawing of a preferred embodiment of the system of the present invention.

In FIGURE 1, an identification card reader-ticket printer 11 is actuated by the insertion of a combination identification card-meter ticket 12. The reader-printer 11 dates the card and transmits an identification number from the machine readable portion of card-ticket 12. This identification signal is fed to a computer 13 which searches its memory storage to determine whether an allowable credit balance remains for the customer having that identification number. If the identification number is spurious or if the customer has taken all of the loads which he is allowed under a pre-set credit limit previously entered into the computer, the computer will not unlock the automatic valve for controlling the dispensing of materials. If an allowable credit balance remains for the customer whose identification card is in the meter-printer 11, the computer will emit a signal which will open automatic valve 14. Withdrawal of materials may then be accomplished by opening manual dispensing valve 15. A meter 16 located in the dispensing line may be automatically or manually zeroed at the start of the withdrawal, and this zero amount printed on the card-ticket 12 by the reader-printer 11. Alternatively, the meter can read cumulatively without zeroing at the beginning of each delivery, with the amount delivered being obtained by subtraction of the cumulative totals before and after delivery.

After the desired amount of material has been dispensed, manual valve 15 is shut off and the final meter reading is transmitted to reader-ticket printer 11 where it is printed onto the card-ticket combination 12. The total amount of the commodity withdrawn is transmitted to the computer where it may be converted into monetary units according to the price of the commodity being dispensed. Alternatively, it may be satisfactory to express the maximum credit limits in terms of loads and to eliminate the conversion of each delivery into monetary units. In either case, the amount delivered is subtracted from the remaining allowable credit balance and the new balance is substituted for the old in the computer memory. Alternatively, the meter pulses during delivery can be transmitted immediately to the computer and the computer can continuously reduce the remaining balance.

The computer may be used to make periodic billings by totaling the amounts of each individual delivery received in its memory storage and then printing out these data when the billing period ends. Also, the computer may be used to maintain continuous inventories on each of the commodities available for sale at the distribution station and may signal whenever a pre-set low level of inventory on a commodity is reached.

While the above preferred embodiment has been illustrated with the use of a combination reader-ticket printer, it should be understood that the system of the present invention may be utilized with identification number reading devices which are separate from the ticket printers. Whether single reader-printers or separate identification readers and ticket printers are utilized, the present invention through the use of a combination identification card-meter ticket provides the advantage of the prevention of confusion of identification cards and tickets. Errors which were previously readily made when a common carrier having a multiple compartment vehicle, each compartment of which was to be delivered to a different customer, confused the identification cards and thus caused the customers to be billed for the wrong commodities are virtually entirely eliminated with the system of the present invention. With the combination identification card-meter ticket, the driver handles only one item per transaction.

The new system may also be utilized where a multiple compartment truck or other vehicle is to be filled with a number of different commodities all of which are to be entered on a single meter ticket and billed to a single customer. In such instances, the vehicle operator proceeds as outlined above in the description of FIGURE 1 loading the desired amount of the first commodity. Thereafter, he moves to a second dispensing station having a separate meter and repeats the procedure. The two stations may utilize a single reader-printer, or may utilize a single reader in conjunction with multiple printing type meters or may each have a separate reader and a separate printer. More elaborate reader-printers can permit two or more commodities to be delivered at one time with amounts being printed on different areas of a single card ticket.

Also, while the system has been illustrated in the above embodiment primarily as a system for the dispensing of petroleum products from a bulk station, it should be understood that a wide variety of other products including fluid products such as water, molasses, sugar syrups, molten sulfur and asphalts; solids such as cement, concrete raw materials, and even non-flowing solid objects such as bricks, steel parts, and smaller devices; and even gases may be dispensed by use of the system of the present invention.

It will be advantageous in some instances to have the combination meter ticket-identification card iself control the quantities of materials to be metered out during the delivery. Thus, in an automatic concrete loading station, the driver might first insert his card into a cement metering system which would measure out the appropriate quantity of cement, then similarly obtain the appropriate quantity of sand, gravel, and water, all according to pre-set values punched in the combination identification card-delivery ticket. These pre-punched values may be inserted by the vendor who may mail the cards to the purchaser for use at the purchaser's convenience, or the purchaser himself may have card punching equipment operated by supervisory personnel with the cards being given to the truck drivers just prior to the pickup of the materials.

While a wide variety of devices may be utilized in the operation of the system of the present invention, the following models have been found to be satisfactory: identification card-reader; Style No. 906-071 manufactured by the Hickok Electrical Instrument Company; combination identification card-meter tickets such as those described in more detail in connection with FIGURE 2; computer Model No. 8090 manufactured by the Control Data Corporation of Minneapolis, Minnesota, and described in their brochure, Computer System Reference Manual; automatic valves such as the Model No. 297-1 manufactured by A. O. Smith Company and described in their Control Valve Catalogue; the meter Model No. S-50 manufactured by the A. O. Smith Company of Erie, Pennsylvania, and described in their Meter Catalogue. A wide variety of dispensing valves such as element 15 may be employed.

Figure 2:
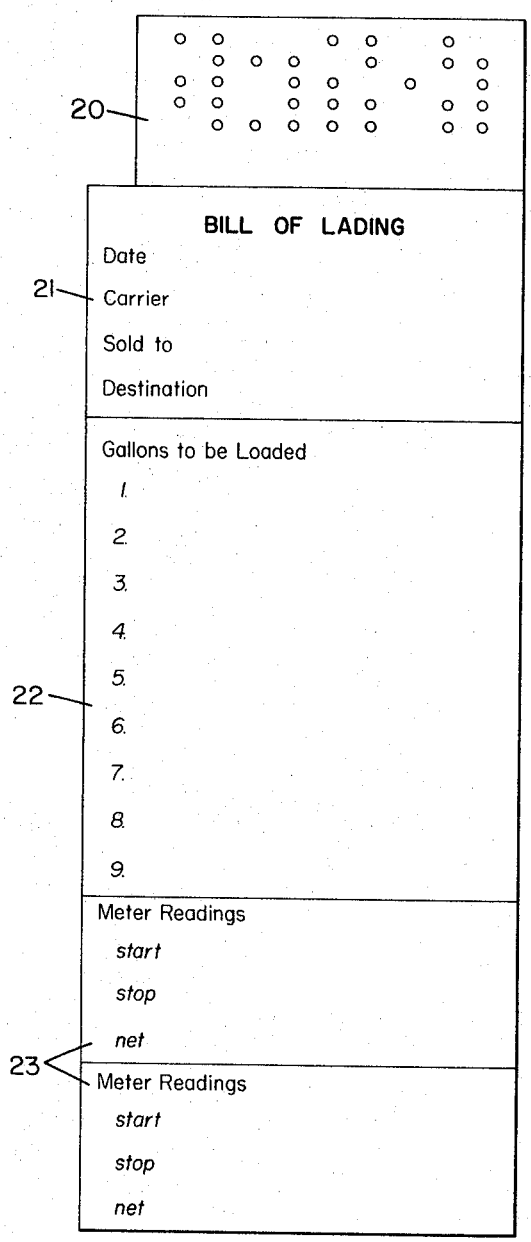
FIGURE 2 is a representation of a preferred embodiment of the combination identification card-meter ticket of the present invention.

FIGURE 2 illustrates a preferred embodiment of the combination identification card-meter ticket utilized in the practice of the present invention. The upper end of the card-ticket 20 is punched to indicate a customer identification number in machine readable form. In place of punching, either machine-readable-printing, edge notching, fluorescent markings, magnetic indicia, or any other machine-readable identification may be utilized.

Immediately beneath the machine readable identification portion of the card-ticket is an area 21 for imprinting, in visually readable type, the customer identification number, dates and any other data which may be useful in connection with the identification of the customer to whom the material is delivered.

The middle portion of the card 22 is lined for the imprinting of the number of gallons to be loaded by the driver of the vehicle. This portion may be filled in by supervisory persons at the driver's home terminal or may be left blank where the amount of delivery is to be determined merely by filling the vehicle tank to its legal capacity.

Various other markings in the center portion serve to permit the use of the card-ticket as a bill of lading and to permit the entry of other items of data such as seal numbers, etc.

The lower portion of the card-ticket 23 is divided into spaces for the entry of initial and final meter readings with space for the calculation of net amounts delivered and for corrections for variations in temperature, density, etc. Where desirable, the ticket may be altered to permit its use in conjunction with meters having automatic temperature correction and which print only the gallonage delivered or even the gallonage delivered together with the total value of the material delivered. Carbon copies will usually be provided for.

The card-ticket may be utilized either by inserting one end in a reader and subsequently inserting the other end in a meter-type printer or, as shown in FIGURE 1, may be utilized in a combination reader-ticket printer which performs the functions of reading the identification and also the printing of the gallonage delivered in the appropriate portions of the card-ticket.

Various other modifications of the system will be apparent including the use of an automatic valve which is not opened but merely unlocked by a signal from the computer thus permitting the elimination of the manual valve shown as element 15 in FIGURE 1; the povision for a retaining punch which stabs through the card-ticket and prevents its removal from the printing device during the delivery of material; the use of a computer which periodically or continuously checks the amount being delivered, and during delivery, continuously or periodically revises the balance of allowable credit remaining so as to shut off the automatic valve should this balance be reduced to zero during the delivery; the attachment of read-out devices which give data from the computer memory, e.g., inventories in response to a coded inquiry over a telephone wire; together with many other modifications. Where relatively inexpensive commodities are being delivered, the system may be simplified by having the measuring device simply count the number of loads delivered and neglecting the variation in the size of the load withdrawn. In this case, credit balances may be expressed in terms of loads permitted to be withdrawn per unit time with the system otherwise operating as described above.

Other modifications include use of identifiable stock such as paper containing a magnetized wire, special inks, etc., to prevent counterfeiting, and reader-printers which deface the identifying card portion to permit only one use per card-ticket.

It should be understood that all such variations are to be considered within the scope of the invention and that the invention is not to be limited by the above described preferred embodiments.

What is claimed is:

1. A system for the dispensing of materials for sale with the quantities of said materials being controlled so as not to exceed pre-set maximum allowable total values in any predetermined time interval, said system comprising, in combination, a computer having a memory device for storing said pre-set maximum values, said computer having means for deducting from said pre-set maximum values, individual amounts corresponding to individual deliveries of material to customers thereby maintaining a continuous balance of remaining allowable values of material which may be withdrawn by each customer; combination identification card-meter tickets having readable markings identifying a single customer, and having space for entering readable indicia of the quantity of materials delivered; an identication reading device for reading said identifying marks from said combination customer identifying card-meter ticket and transmitting said identication to said computer; a metering device for metering said materials during delivery to said customer, said metering device having means for marking said combination identication card-meter ticket with markings indicating the amount of material delivered; an automatic dispensing control means controlling the dispensing of said materials and operably connected to open in response to a signal from said computer indicating that said customer has a balance of allowable values remaining according to said computer, whereby when said combination card-meter ticket is inserted into said identification reading device, a signal is transmitted which causes the computer to locate any balance in its memory storage which corresponds to said identification, said computer then emitting a signal to open said automatic dispensing control means, the signal being omitted by said computer if no balance corresponding to said identification is found in said memory storage.

2. The system of claim 1 wherein the metering device transmits signals indicating the amount delivered, and wherein this amount is deducted from the balance remaining in said computer memory.

3. The system of claim 1 wherein the combination identification card and meter ticket has space for the entry of visually readable markings indicating the quantity delivered of each of a plurality of materials.

4. A method for the dispensing of material for sale with the quantities of said material being controlled so as not to exceed pre-set maximum allowable total values in any predetermined time interval, said method utilizing, in combination, a computer having a memory device for storing said pre-set maximum values, said computer having means for deducting from said pre-set maximum values individual amounts corresponding to individual deliveries of material to customers, thereby maintaining a continuous balance of remaining allowable values of materials which may be withdrawn by each individual customer identification card and meter ticket which is imprinted prior to presentation with customer identifying markings which are readable by identification reading means in the dispensing system, said combination card-ticket having space for entering readable indicia of the quantity of materials delivered; an identification reading device for reading said customer identifying markings from said combination customer identifying card-meter ticket and transmitting a signal indicative of said identification to said computer; a metering device for metering said material during delivery to said customer, said metering device having means for marking said combination identification card-meter ticket with post-delivery markings indicative of the amount of material delivered and for transmitting to said computer signals indicative of the amount of material delivered; dispensing control means controlling the dispensing of said materials and operably connected to said computer to open in response to a signal from said computer indicating that said customer continues to have a balance of allowable values remaining in the memory storage of said computer, said method comprising in combination; receiving said customer identification card-meter ticket in said identification reading device, reading the customer identification from said card-ticket in said identification reading device, transmitting a signal from said identification reading device which signal causes said computer to locate in its memory, any balance of remaining allowable materials which corresponds to said customer identification, thereafter emitting a signal from said computer to open said dispensing control means only when a balance corresponding to said customer identification is found in said computer memory.

5. The method of claim 4 wherein after the completion of delivery said card-ticket is imprinted with indicia indicative of the quantity of material delivered and a signal indicative of said quantity delivered is transmitted to said computer and is deducted from the balance of remaining allowable values of materials corresponding to the customer indicated by the machine-readable indicia on said card-ticket.

References Cited by the Examiner

UNITED STATES PATENTS

| | | |
|---|---|---|
| 2,594,388 | 4/1952 | Broussard. |
| 2,905,926 | 9/1959 | Aid _____ 222—2 |
| 3,053,415 | 9/1962 | Pennington _____ 346—54 X |
| 3,204,741 | 9/1965 | Maxwell et al. _____ 194—4 |
| 3,254,749 | 6/1966 | Scherer _____ 222—2 X |

ROBERT B. REEVES, *Primary Examiner.*

STANLEY H. TOLLBERG, M. HENSON WOOD, JR.,
*Examiners.*